J. W. BLOOD.
DAMPER.
APPLICATION FILED OCT. 14, 1912.

1,065,023. Patented June 17, 1913.

WITTNESSES
H. E. Lambert
E. A. Paul

INVENTOR
JOSEPH W. BLOOD
BY Paul & Paul
ATTORNEYS

COLUMBIA PLANOGRAPH CO., WASHINGTON, D. C.

UNITED STATES PATENT OFFICE.

JOSEPH W. BLOOD, OF MINNEAPOLIS, MINNESOTA.

DAMPER.

1,065,023.  Specification of Letters Patent.  Patented June 17, 1913.

Application filed October 14, 1912. Serial No. 725,609.

*To all whom it may concern:*

Be it known that I, JOSEPH W. BLOOD, a citizen of the United States, resident of Minneapolis, Hennepin county, Minnesota, have invented certain new and useful Improvements in Dampers, of which the following is a specification.

My invention relates to dampers designed for use particularly in connection with smoke flues, though capable of use wherever it is desired to regulate the flow of currents of air through a pipe, and the object of the invention is to provide a damper which can be easily and quickly adjusted and will effectually control the draft in the pipe.

A further object is to provide a damper of simple construction and one which can be easily and quickly applied to a pipe.

The invention consists generally in various constructions and combinations, all as hereinafter described and particularly pointed out in the claims.

Figure 1:
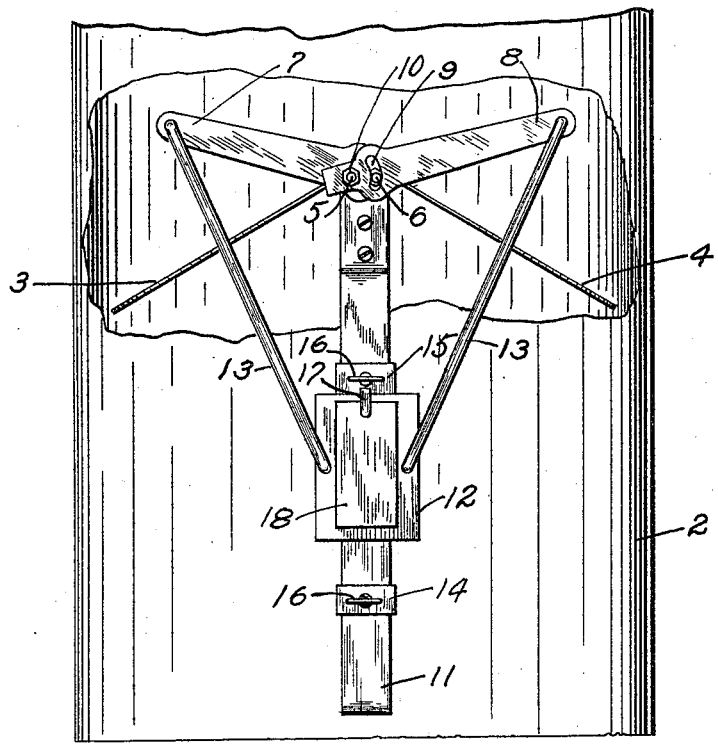
Figure 2:
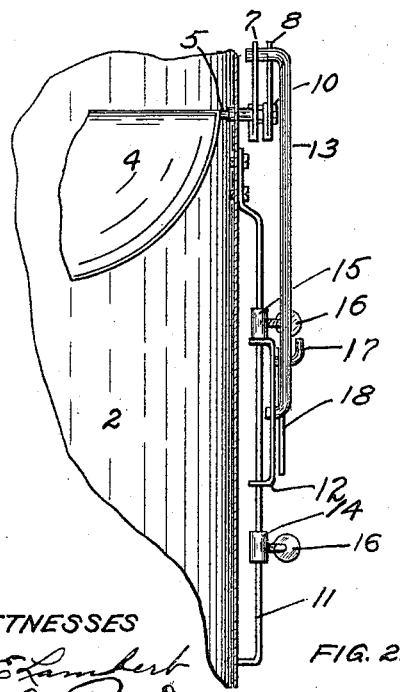
Figure 3:
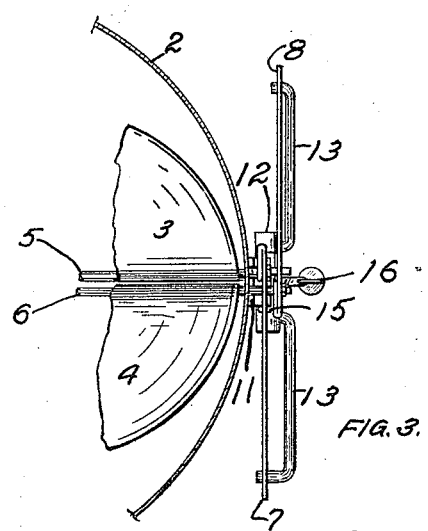

In the accompanying drawings forming a part of this specification, Figure 1 is an elevation of a section of pipe, showing my invention applied thereto, the wall of the pipe being broken away to illustrate the position of the damper therein, Fig. 2 is a detail sectional view showing the mechanism for controlling the movement of the damper, Fig. 3 is a horizontal sectional view through the damper-controlling mechanism.

In the drawing, 2 represents a section of pipe in which the damper is mounted. The damper preferably consists of wings 3 and 4, substantially semi-circular in form, provided with spindles 5 and 6 arranged side by side and journaled at their ends in the walls of the pipe or flue, or in a frame which may be inserted into the flue. The ends of these spindles project out beyond the pipe on one side. Upon these projecting ends arms 7 and 8 are secured, one of said arms being preferably provided with a curved slot to receive the projecting spindle of the other damper wing. The projecting ends of the spindles are preferably provided with lock nuts for convenience in fastening the arms thereon. Beneath the spindles and secured to the walls of the pipe or flue is a bracket 11 having inwardly turned ends bearing on the pipe and a middle portion that is spaced from the pipe walls to form a guide for the slide 12. This slide is pivotally connected by links 13 with the ends of the arms 7 and 8. The slide has a vertical movement on the bracket 11 and stops 14 and 15 are preferably provided on the bracket, one on each side of the slide, each stop having a thumb screw 16 to engage the bracket and lock the stop in any desired position thereon. The position of these stops on the bracket regulates the travel of the slide and the movement of the damper wings. The wings are adapted to hang by gravity in an inclined position when the flue is not in use but will swing outwardly, away from one another, to partially close the pipe when the draft is sufficient therethrough to lift the wings. Evidently, the stronger the draft the greater the movement of the wings toward a horizontal position. As the draft increases, the damper wings or blades will swing outwardly automatically to check the currents flowing through the flue, and as the draft decreases, the wings will drop down to an inclined position and expose a larger opening through the flue for the passage of the products of combustion. I do not confine myself to any particular position or degree of inclination of the damper blades in the flue, as the travel of the blades and their position when open may be varied to suit different requirements.

By means of the stops I am able to regulate the movement of the slide and the travel of the damper wings, allowing them to swing partially open or partially closed, as desired. I prefer also to provide a hook 17 on the slide on which counter-balance weights 18 may be suspended for the purpose of balancing the weight of the damper wings, to vary their position to suit the draft. The counter-balance is entirely independent of the stops and may be changed to suit the different draft conditions. By means of the stops I am able to regulate the movement of the wings or blades. By moving the stops up against the slide, the damper wings may be locked in any desired position and by separating the stops a full or a partial movement of the wings is permitted.

In various ways the details of construction herein set forth may be modified without departing from the spirit of my invention.

I claim as my invention:—

1. A damper comprising blades or wings, parallel spindles whereon said blades are mounted, arms mounted on the outer adjacent ends of said spindles, each of said arms having a transverse slot therein near its spindle to receive the projecting end of the other spindle, a guide disposed at right angles substantially to said spindles, a slide on said guide, links connecting said slide with the outer portions of said arms, and means for regulating the travel of said slide on said guide.

2. The combination, with a flue, of parallel spindles journaled therein, damper blades mounted on said spindles, said spindles projecting beyond said flue, arms secured on said spindles, a guide bar secured to said flue at right angles substantially to said spindles, a slide mounted on said guide, adjustable stops carried by said guide above and below said slide for regulating the movement of said slide, and links pivotally connecting said slide with the outer portions of said arms.

3. The combination, with a pipe, of damper spindles journaled therein, blades carried by said spindles, arms secured to the projecting ends of said spindles, a guide bar secured to said pipe and extending vertically thereon, stops adjustably mounted on said guide bar, a slide interposed between said stops on said guide bar, links pivotally connecting said slide with the outer portions of said arms, said slide having a hook thereon adapted to support a weight, whereby said damper blades may be balanced.

In witness whereof, I have hereunto set my hand this 9th day of October, 1912.

JOSEPH W. BLOOD.

Witnesses:
  GENEVIEVE E. SORENSEN,
  EDWARD A. PAUL.

---

Copies of this patent may be obtained for five cents each, by addressing the "Commissioner of Patents, Washington, D. C."